Dec. 14, 1965    R. W. WHEELER    3,223,506
METHOD AND APPARATUS FOR VERTICALLY SUPPORTING
AND HEAT TREATING A GLASS SHEET
Filed July 26, 1962    5 Sheets-Sheet 1
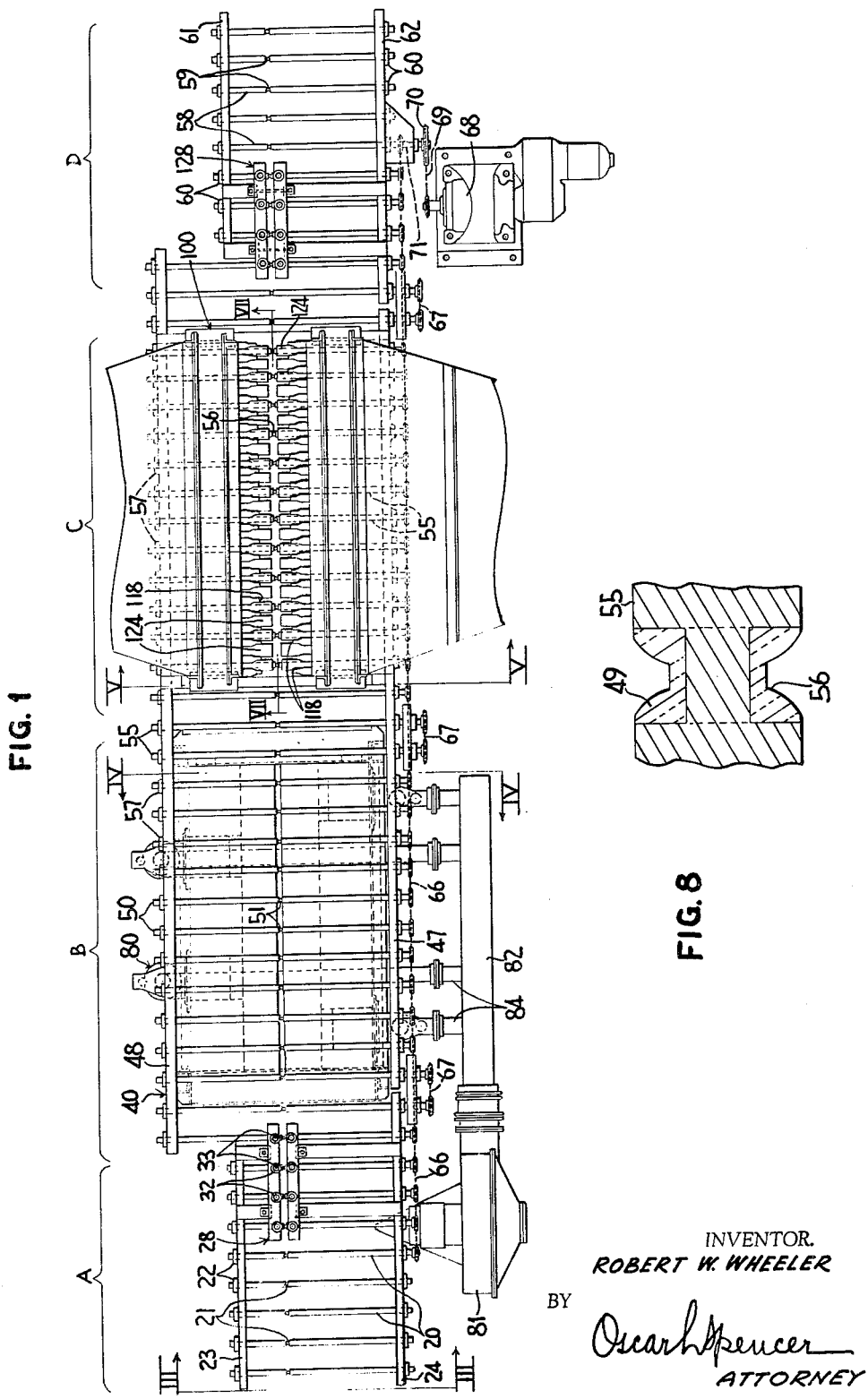
INVENTOR.
ROBERT W. WHEELER
BY
Oscar H. Spencer
ATTORNEY Dec. 14, 1965    R. W. WHEELER    3,223,506
METHOD AND APPARATUS FOR VERTICALLY SUPPORTING
AND HEAT TREATING A GLASS SHEET
Filed July 26, 1962    5 Sheets-Sheet 2
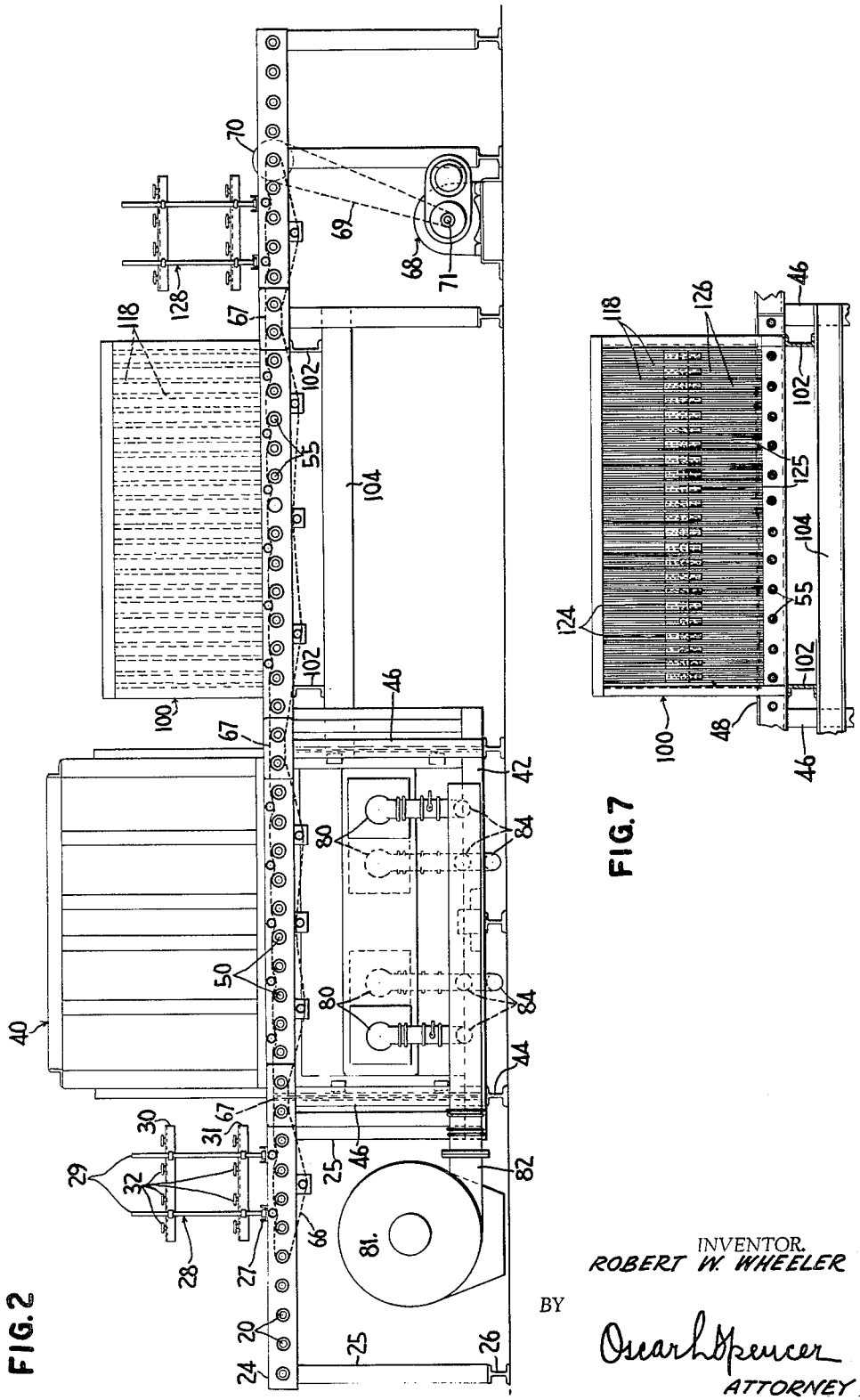
INVENTOR.
ROBERT W. WHEELER
BY
Oscar L Spencer
ATTORNEY Dec. 14, 1965 R. W. WHEELER 3,223,506
METHOD AND APPARATUS FOR VERTICALLY SUPPORTING
AND HEAT TREATING A GLASS SHEET
Filed July 26, 1962 5 Sheets-Sheet 3

INVENTOR.
ROBERT W. WHEELER
BY
Oscar L. Spencer
ATTORNEY

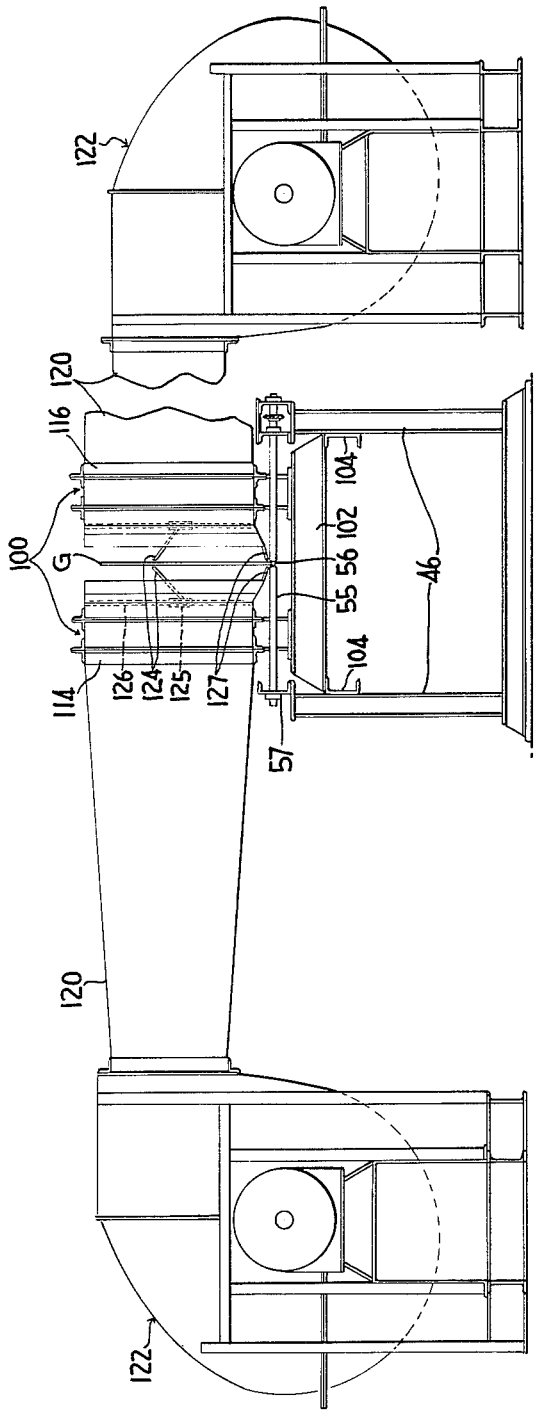

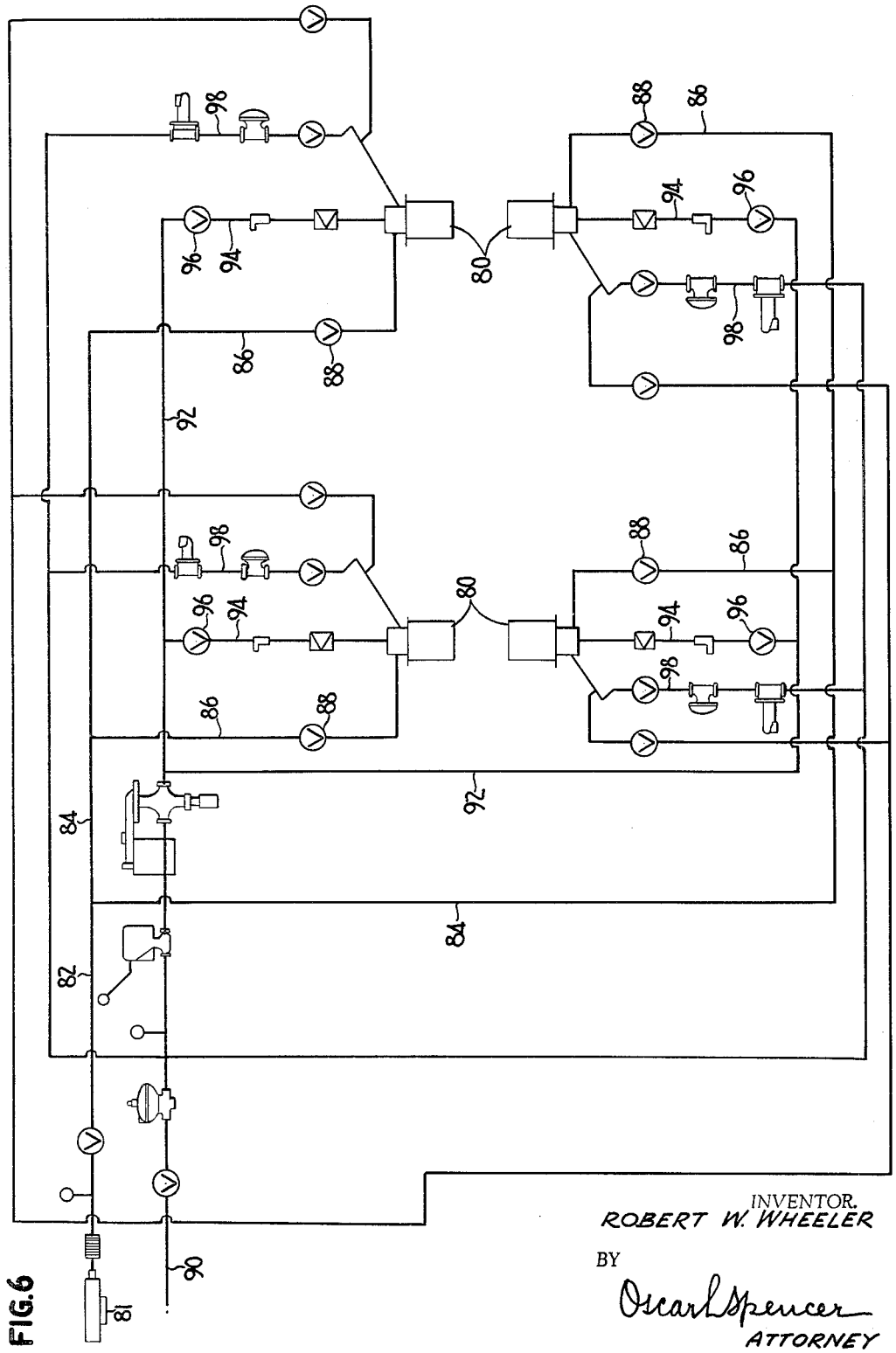

United States Patent Office 3,223,506
Patented Dec. 14, 1965

3,223,506
METHOD AND APPARATUS FOR VERTICALLY SUPPORTING AND HEAT TREATING A GLASS SHEET
Robert W. Wheeler, Pittsburgh, Pa., assignor to Pittsburgh Plate Glass Company, Pittsburgh, Pa., a corporation of Pennsylvania
Filed July 26, 1962, Ser. No. 212,682
9 Claims. (Cl. 65—114)

This invention relates to the fabrication of glass and more particularly to transportation of hot glass sheets, especially in connection with other operations, such as tempering, annealing or coating such sheets.

Sheets of glass may be fabricated through known manufacturing techniques of tempering, annealing or coating and combinations of such techniques to form end products having characteristics and uses different from the original product. A common feature of these techniques is the heating of glass sheets to a temperature above that at which the major surfaces or the contour thereof will be changed by a deforming stress on contact with solids, hereinafter referred to as deformation temperature. For most plate and window glass, this temperature is around 980 degrees Fahrenheit and above, but usually below a temperature at which the glass becomes molten.

Economic utilization of fabricating equipment requires that the glass sheets undergoing treatment be conveyed while hot.

The necessity of conveying glass at high temperature has heretofore resulted in undesirable deformation or marring of the major surfaces of glass sheets being treated due to physical contact with supporting and conveying apparatus while the glass is at elevated temperatures. The present invention overcomes this defect common to the known methods of heat treating glass sheets. In addition, this invention overcomes further disadvantages peculiar to some of the individual fabricating techniques.

Included in the present invention are new and useful methods and apparatus for supporting and conveying hot glass. More specifically, methods and apparatus have been devised for supporting and conveying a sheet of glass in an upright position while the glass is at or above deformation temperature. The glass sheet is physically supported at its lower edge and maintained in a substantially vertical plane by an upwardly directed flow of gas on each side of the upright sheet. This arrangement supports the glass against undesired deformation and eliminates the necessity for the major surfaces of the glass sheet to contact any solid object while the glass is subject to thermal deformation or impairment. In this manner, the marring or distorting now associated with current flat glass fabricating processes has been eliminated.

In tempering flat sheets, the prior art uses one of three alternative means of support. In one, the glass is gripped near an upper margin by tongs suspended from a carriage. The latter moves on a conveyor to transfer the glass from a furnace either horizontally or vertically to a position between adjacent, opposing blowers which quench or temper the glass. Alternatively, the glass may rest at its bottom edge on a mesh support carried by the conveyor and be balanced in an upright position by fingers loosely mounted on its upper edge and/or along one or both side edges. In a second alternative, flat glass is simply conveyed through a furnace and thence between horizontal blowers with the bottom major surface of the glass supported on rolls of small diameter closely centered so as to diminish the distance between lines of support.

The vertical processes leave tong or finger marks and develop uneven stresses attributable to local heat transfer differentials in the vicinity of the mesh, fingers and tongs. Tong suspension has the additional drawback of causing vents, tears or distortions in the vicinity of the gripping points when the glass is heated to a deformation temperature.

The roller process leaves roll marks, scuff marks, and other defects, in addition to which a certain degree of "wave" distortion is inevitably imparted to the sheet as a consequence of the glass undulating over the rolls as it softens in its travel.

In the present invention, glass sheets, for example, flat sheets to be tempered, are disposed generally upright upon a lower horizontal edge extending in the direction of travel and physically supported on conveying rolls which control the movement of the sheets while they are being processed. A generally upward flow of gas on each side of the sheet of glass maintains the glass in an upright position to prevent physical contact of its major surfaces with solid members and consequent deformation while heated to a deformation temperature.

After reaching the desired temperature, each sheet is moved between opposing cold gas flows directed at the major surfaces of the glass and having an upward component of flow sufficient to maintain the glass in its upright position. A plenum chamber pressure as low as .1 inch of water column is sufficient to balance glass sheets 30 inches high having a nominal thickness of ¼ inch when vertically supported in the manner herein disclosed. The cold gas flow has sufficiently low temperature and rate of flow to establish the necessary thermal gradient between the surfaces and interior of the glass and the glass is thus tempered without the marring or distortion characteristic of the prior art.

The exclusive contact of the major surfaces by heated gas flowing uniformly over the glass surfaces insures the attainment of a more uniform surface temperature and more equal center to surface temperature gradients than those formerly obtained with the employment of solid support members. This is because absence of solid members in contact with the major glass surfaces avoids local departures from the desired temperature pattern.

The uniform flow of cold gas against opposite, uniformly heated surfaces results in a more uniform heat transfer from the glass sheets on cooling than was obtainable with the prior art. As a result, the nonuniform stresses and iridescent patterns appearing in the sheet after heating and cooling are substantially reduced from those found in sheets processed by prior art techniques.

In known processes of annealing, glass exhibiting undesirably high internal stresses is conveyed with its bottom major surface supported on rollers through a lehr. In the lehr, the glass is reheated substantially to its upper annealing range to allow stresses to relax and is then cooled in a controlled manner through the lower limit of its annealing range. A nonuniform support and the unavoidable slippage between the rollers and the bottom major surface of the softened glass results in distortion and surface marring of the sheets. In the manner herein disclosed, glass may be reheated and annealed without the attendant disadvantages of the known processes. This is accomplished by supporting and conveying the heated sheets of glass on a lower edge of the glass while the major surfaces thereof are maintained in a vertical disposition by an upwardly directed flow of gas on each side thereof. In this manner, physical contact of any solid member by the major surfaces of the glass is avoided.

Coated glass has myriad end uses. Many coatings require heat treatment during fabrication. For instance, in producing flat colored spandrels for architectural purposes, flat sheet glass is coated cold on one side with a frit or enamel and then "fired" to glaze the frit and bond it to the glass surface. Firing temperatures of most frits exceed the deformation temperature of the flat glass substrate. If produced on roller conveyors, wave, bow and other distortion results. If processed while suspended by tongs, tong marks ensue. Usually the product is chilled after firing to produce a semi-temper or partial strengthening.

There is a desideratum for higher temperature in firing because the durability of the coating is enhanced thereby. The prior art is limited in this regard because above about 1150 degrees Fahrenheit, tongs not only indent but more or less tear the glass along the points of contact, while in the roller system intolerable wave results.

The present invention overcomes all these defects. The coated sheet can be fired at higher temperatures without marring or distortion. It can be tempered to the degree desired by control of the rates of flow in the quenching section.

Again, a variety of useful end products are produced by applying metallic salt solutions or dispersions on glass. Transparent heat reflecting films are produced when solutions of titanium and other metal salts are sprayed on cold glass and subsequently heated. Other decorative and protective coatings result from roll coating polysiloxane and metalo-organic compositions onto glass surfaces and subsequently heating the coated glass to produce a metal oxide or silica coating.

As in the case of enamels, the inadequacies of the prior art limit the temperature of sheet glass treatment below optimum temperatures desirable in achieving maximum durability. The glass is marred and distorted in treatment. These deficiencies are overcome in utilizing the present invention.

Applicant has, through the use of the methods and apparatus disclosed herein which form the subject matter of this invention, overcome the above discussed disadvantages of the known methods of treating, supporting and conveying glass requiring elevated temperatures.

In its broader aspects, the present invention contemplates the provision of a conveying system adapted for handling hot glass, or other heat deformable material, in sheet form without marring or otherwise producing uncontrolled deformation in the major surfaces, even when the glass or other material is at a deformation temperature. In accordance with an embodiment of the invention, there is provided an upward flow of gas over each major surface of the glass sheet within a restricted passageway formed by vertically disposed parallel walls spaced from each other to provide a narrow passageway for the glass and the flow of gas. A plurality of conveying rolls horizontally aligned and directly beneath the bottom portion of the vertical walls support the glass sheet along a bottom edge. The rolls are notched to provide a row of aligned notches between the walls defining a path of movement for the glass sheets.

Gas flows from a reservoir under pressure up each side of the glass sheet through the restricted passageways formed by the glass sheet and the vertical walls on each side thereof. This flow of gas escapes through the open top of the restricted passageway. In operation, the rate of flow and the space between the major surfaces of the glass sheet and the vertical wall on each side thereof permit the formation of a restoring pressure on either side of the glass if the glass alignment tends to deviate from the vertical.

More particularly, the invention contemplates a vertical support system in which glass is introduced into the gas support area in an upright position and at a temperature below that at which its major surfaces will mar on physical contact with solid objects. The glass is heated above deformation temperature while maintained in an upright position by gas flow and is then cooled until below deformation temperature before removal from the gas support.

The system is particularly well adapted to heating flat glass in the form of sheets or the like in which the thickness is small relative to the length and width, the thickness generally ranging from ⅛ inch or less up to ½ to 1 inch, then directing relatively cold gas at and along the glass surfaces to rapidly cool or quench the surfaces as well as to maintain the vertical disposition of the glass, the cooling effect on each side being substantially equal. Heat transfer from the two major surfaces continues rapidly until the entire body is cooled to below its annealing range. This establishes a permanent stress pattern or temper in the glass sheet.

Advantageously, heating of glass in the vertical gas support zone is accomplished by burning a controlled admixture of gas and air, introducing the hot products of combustion to the reservoir or plenum chamber which supplies the flow of gas through the restricted passageways on each side of the vertically disposed sheet. The heat thus supplied to the glass may be supplemented by radiant heat from independently controlled heat sources which are generally disposed in facing relation to the vertical plane of the path of movement taken by the glass sheets.

The attendant advantages of this invention (and the various embodiments thereof) will be readily appreciated as the same become better understood by reference to the following detailed description of an illustrative embodiment when considered in connection with the accompanying drawings in which:

FIG. 1 is a partial plan and part horizontal sectional view of an illustrative embodiment of the present invention with parts omitted to show the apparatus to the largest scale possible;

FIG. 2 is a fragmentary longitudinal side elevation of the apparatus of FIG. 1 taken along the path of movement of the glass sheets;

FIG. 5 is a sectionalized view of the end of the quenching station taken along the lines V—V of FIG. 1;

FIG. 6 is a schematic diagram of air supply and gas supply lines for the burners;

FIG. 7 is a longitudinal section of the quenching station along the lines VII—VII of FIG. 1;

FIG. 8 is a fragmentary section showing the construction of certain conveyor rolls in the portion of the conveyor immediately beyond the furnace exit.

Figure 4:
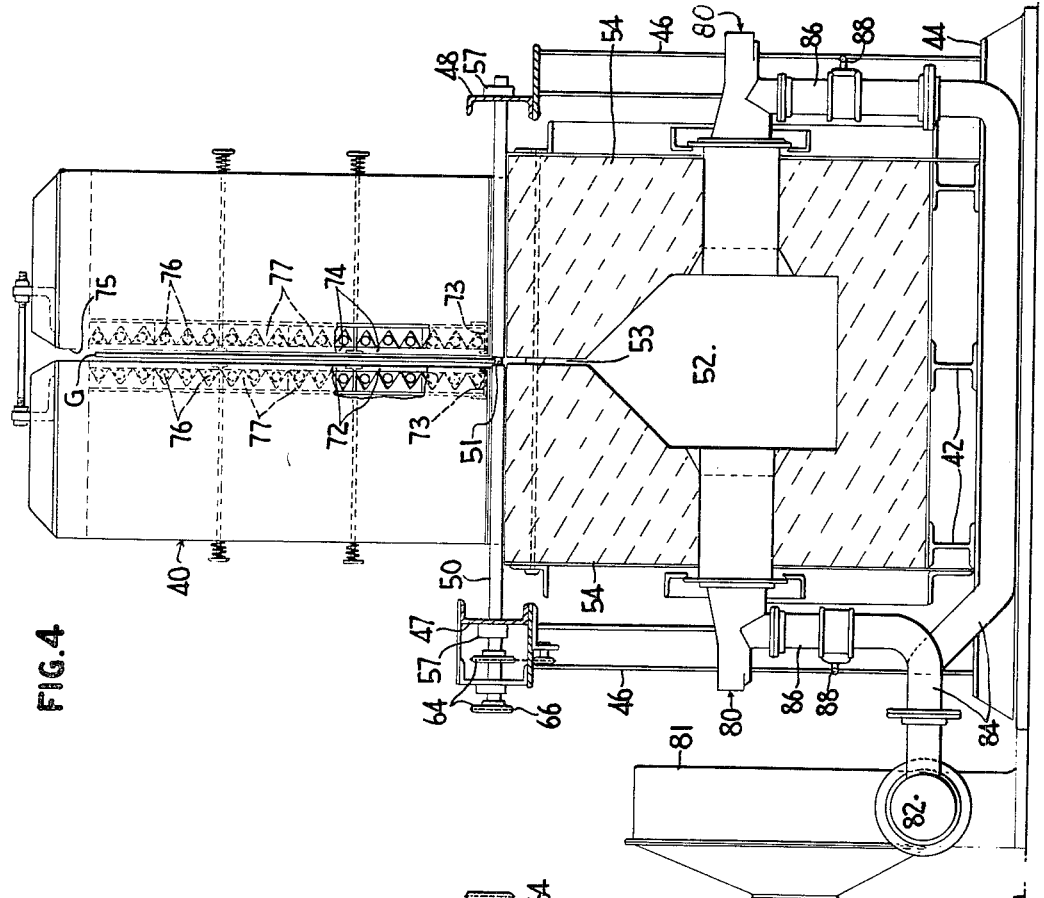
FIG. 4 is a sectionalized view of the furnace taken along the lines IV—IV of FIG. 1, with parts broken away to show certain elements.

Referring to the drawings, FIGS. 1 and 2 illustrate a system advantageously employed for heating flat glass products up to or above the deformation temperature, e.g., to a temperature at which the glass can be tempered, quenching such parts while hot and delivering the parts thus tempered into a roll conveyor for removal. The component sections making up the complete system are a roller unit A, a heating section B, a quenching section C and a delivery roll system D.

In roller unit A glass sheets are loaded. In heating section B the glass is supported and conveyed by its bottom edge on rollers, maintained in its vertical position by an upward flow of heated gas on each side thereof and heated from room temperature to a temperature high enough for the tempering process, supplemental heat being supplied by radiant heat sources on each side of the vertical path through which the glass travels. In quenching section C, the glass is rapidly chilled and maintained in an upright position between opposed flowing streams of cool air while being supported and conveyed by its bottom edge on rollers. Delivery roll system D receives the tempered glass sheets from the quenching system at a temperature considerably below the deformation temperature and conveys them to their next destination.

Roller unit A comprises a plurality of horizontally aligned supporting rolls 20 provided with grooves 21 aligned longitudinally of the apparatus. Rolls 20 are supported for rotation in journal blocks 22 fastened on horizontally aligned parallel channels 23 and 24 extending longitudinally of the apparatus. Parallel channels 23 and 24 are supported by posts 25, which, in turn, rest on horizontal I-beams 26. Additional reinforcing members, such as I-beams 34 (FIG. 3), interconnect posts 25 if additional structural rigidity is desired.

Cantilever members 27 (FIGS. 2 and 3) interconnect channels 23 or 24 with one of a pair of roller support frames 28. Each roller support frame comprises at least two posts 29, an upper angle iron 30 and a lower angle iron 31 interconnecting the posts. Free running rolls 32 are rotatably mounted on vertical stub shafts 33 supported by the upper and lower angle irons. The roller support frames 28 are symmetrically located on opposite sides of a vertical plane intersecting the grooves 21 of rolls 20. The diameters of the free running rolls 32 are identical and sufficiently less than the distance separating vertical stub shafts 33 to provide a space therebetween for the thickness of the glass sheets to be processed. The latter space is aligned in a vertical plane which forms a path of travel for glass sheets through the apparatus.

Figure 3:
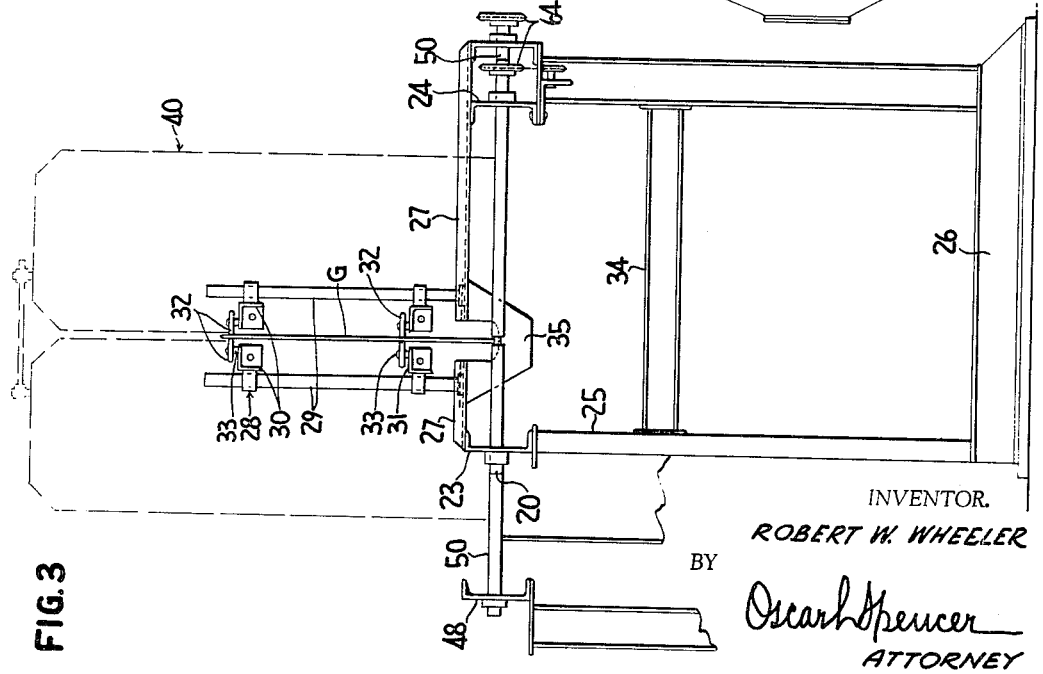
FIG. 3 is an end elevation of the apparatus of FIGS. 1 and 2 taken along the lines III—III of FIG. 1.

As shown in FIG. 3, a glass sheet G rests with its bottom edge supported in grooves 21 while it is balanced between spaced pairs of opposed free running rolls 32. A slotted bracket 35 interconnects the inner ends of each pair of laterally opposed cantilever members 27. The slots in the brackets 35 provide clearance for the bottom edge of glass sheets conveyed along the grooves 21 of successive rolls 20.

Heating section B (see FIGS. 1, 2 and 4) consists of a furnace indicated generally at 40 supported on longitudinally extending beams 42 and transverse beams 44. Vertical support members 46 are included to support parallel longitudinally extending roller support members 47 and 48.

A plenum chamber 52 (see FIG. 4) is formed by suitable insulating blocks in the lower portion of the furnace or heating section beneath the conveyor rolls 50 and extends the entire length of the heating section B. Plenum chamber 52 is relatively wide in its bottom portion and tapers in width upwardly to form an elongated slot opening 53 extending lengthwise of the heating section B and communicating between the plenum chamber 52 and a restricted passageway for glass sheets above the grooved rolls 50, to be described later. The horizontally aligned supporting rolls 50 are longitudinally spaced from one another and extend at right angles to and above the vertical walls 54 of the plenum chamber 52.

Additional rolls 55 (FIGS. 1, 2 and 5), similar to rolls 50 and grooved at 56, are located in the tempering or quenching section C. As shown in FIG. 8, the rolls 55 immediately following the heating section B and also located in the quenching section C are insulated at the grooved portions 56 by a plurality of layers or sleeves 49 of fiber glass cloth inserted in a notched portion of each roll and forming a suitably shaped groove. Alternatively, an insulating sleeve of rigid material, such as a heat insulating ceramic, may be provided, or the rolls in this critical region of the conveyor may be heated to eliminate the need for the insulation which prevents chill cracking of the glass from contact with the metal rollers.

Rolls 50 and 55, grooved at 51 and 56, repsectively, extend between bearing housings 57 supported along members 47 and 48. Rolls 50 and 55 are horizontally aligned with rolls 20, and grooves 51 and 56 are linearly aligned with grooves 21. Thus, grooves 51 and 56 form continuations of the path of travel of the glass sheets G provided by grooves 21.

Additional rolls 58, similar to rolls 20, form the portion of the conveyor section extending through the delivery system D. Rolls 58 are provided with grooves 59, similar to grooves 21, 51 and 56, and are rotatably mounted at their ends in journals 60 carried by parallel channel members 61 and 62. All the conveying rolls 20, 50, 55 and 58, except for the first four rolls and the last four rolls of the conveyor system, are rotated by suitable driving means, such as sprockets 64 fastened to one end of each roll. A series of roller chain drives 66 and connecting roller chains 67 interconnect all of the rolls provided with sprockets 64. In this manner, the rolls of all sections are driven at the same peripheral speed from the drive shaft of a motor 68 through a chain linkage 69, a driven sprocket 70 on one of the roller shafts 58, and a chain driven shaft 71.

Centrally of the furnace in the heating section B and disposed vertically in spaced parallel relationship on opposite sides of the grooves 51 are two relatively thin plates 72 and 74 which form a restricted vertical passageway 75 extending the length of the heating section. The passageway 75 formed by the plates is in communication at its bottom with plenum chamber 52 through the elongated slot opening 53. The top and ends of the vertical pasageway 75 is open to the atmosphere.

Plates 72 and 74 are formed of silicon carbide or other suitable metallic or ceramic refractory material capable of withstanding the high temperatures of operation without heat deformation. These plates are formed in a plurality of sections of equal height and are supported at their bottom by support elements 73. The plates 72 and 74 abut each other at their side edges to form continuous vertical walls defining passageway 75. Conveying rolls 50, extending through the furnace, pass below these plates. The grooves 51 provide a plane of support for the bottom edge of glass sheets being treated to position the sheets above the plenum chamber 52 and below the opening to the atmosphere at the upper end of the passageway 75.

Spaced from the outer sides of the vertically disposed parallel plates 72 and 74 are radiant heating elements 76 disposed in ceramic holders 77. Heating elements 76 are divided into vertical and horizontal zones so that the temperature along the path of glass travel and transversely thereto may be regulated.

The circumferential recess 51 in each conveying roll 50 of the heating section B is located substantially centrally of the vertical passageway 75 formed by spaced plates 72 and 74. This recess serves to locate the bottom supported edge of a glass sheet being conveyed so as to assure a path for the upward flow of gases from the plenum chamber 52 through the elongated slot opening 53 along each side of the glass sheet between each major surface thereof and one of the spaced plates forming the vertical passageway 75.

A plurality of burners 80 are located in spaced relation along the length of the heating section B to supply hot gases under pressure to the plenum chamber 52. Half the burners are located along each opposite side wall 54 of the furnace 40.

To supply air under pressure to the hot gas support combustion system, one or more blowers 81 (FIG. 6) are employed to feed air under pressure through a conduit 82 to a pair of manifolds 84. As best shown in FIGS. 2 and 4, each individual burner 80 is supplied with air from a manifold 84 through a conduit 86, each provided with a valve 88.

Combustible gas from a main 90 is introduced through branch conduits 92 into each burner 80 by a gas conduit 94, each individually valved as at 96.

Each burner 80 is of the so-called nozzle-mix, excess-air heater type. Combustible gas is mixed with an excess of air within each burner and is ignited by a pilot burner supplied through a suitable pilot line 98. Burners suitable for use in apparatus described herein are of the type such as North American series 223GXSA gas burners.

The combustion of the products in the combustion chamber of the burner supplies the plenum chamber 52 with heated gas at a uniform temperature and pressure through passageways in the plenum chamber walls. Adequate control of pressure and temperature is provided by correlating the rates of input of air and fuel to the burners. The total supply of air and fuel is enough to effect the desired support under normal conditions. The amount of fuel used is determined by the amount of heat needed to raise the glass surface temperature to the desired level. Normally, an excess of air is used over that required for the combustion of the fuel gas, and the supply of excess air and fuel may be varied to change the pressure in the plenum. Gas from the plenum chamber 52 (that is, a mixture of heated air and combustion products) escapes upwardly through the vertical passageway 75 between parallel plates 72 and 74, through the space between adjacent conveying rolls 50.

The tempering or quenching section C is best understood from FIGS. 1, 2, 5 and 7. A pair of support frames 100 are rigidly secured to cross beams 102 of channel shape. The latter are supported by longitudinally extending channel members 104 which, in turn, interconnect vertical support members 46 below the horizontal plane of the roll conveyor.

Plenum chambers 114 and 116 are spaced on each side of the vertical plane of travel of the glass being conveyed. Blowers 122 blow air under pressure to the plenum chambers. Each chamber is supported by one of the support frames 100 and has spaced, opposed slotted openings 118 disposed in vertical planes spaced from one another along the direction of glass travel. These slots extend the entire vertical height of the conveying path. Conduits 120 supply chambers 114 and 116 with air from blowers 122. This air is supplied at a suitable rate of flow and pressure to quench the glass sheets passing through the quenching section C between the opposing openings 118.

In order to provide a vertical component of air flow sufficient to maintain the glass sheets in balanced vertical position while in the quenching section C, oblique baffles 124 extend inwardly and upwardly from sleeves 125 adjustably secured to vertical posts 126. The latter are attached to a plenum chamber reinforcement (not shown) between adjacent slots 118. The oblique baffles 124 are located intermediate the upper and lower extremities of the plenum chambers. Also, additional baffles 127 extend inwardly from the bottom of the slotted openings 118 between the latter to restrict the bottom opening of the passage through the quenching section C. The top of the passage is unrestricted. This combination of structural elements promotes an upward component of air flow in the quenching section C along the opposite surfaces of the vertically oriented glass sheets conveyed through the quenching section.

The delivery section D, as shown in FIGS. 1 and 2, is of the same construction as the roller unit A in front of the heating section B, except that it is reversed front to rear compared to roller unit A. Roller support frames 128 are constructed similarly to roller support frames 28 of the roller unit A to support the quenched glass sheets, which are now below deformation temperature, in vertical alignment with the conveying path of the sheets through the heating and quenching sections with their bottom edges supported on the aligned grooves 59 of the conveyor rolls 58.

OPERATION

The following are examples, by way of illustration only, of preferred modes of operation of the invention disclosed herein as applied to the treatment of glass sheets.

A. *Tempering*

Sheets of glass are vertically disposed upon the roller unit A and held in proper vertical alignment by rollers 32. In this manner, glass sheets are conveyed seriatim into the heating section B, where they are supported by rolls 20 and guided for movement centrally of the elongated restricted passage 75 by their bottom edges resting on circumferential grooves 21.

As the glass leaves the roller unit A and enters the heating unit B, proper vertical alignment of the glass sheet is maintained by an upward flow of heated gas from the plenum 52 through the restricted passageway 75 on each side of the glass sheet between the spaced plates 72 and 74. The bottom edge of the glass plate is centered within the space between plates 72 and 74 by groove 51 in conveying rolls 50 to assure the upward flow of gas on each side of the glass sheet. Conveying rolls 50 provide frictional force necessary to convey the glass sheets by rotation of the rolls.

In a typical operation, glass sheets 2 feet high of ¼ inch nominal thickness were passed through a furnace 6 feet long at a speed of 1.5 feet per minute for a heating cycle of 4 minutes. Gas burners 80 were supplied a mixture of natural gas and air in proportions by volume of approximately 1 to 40, respectively, which includes about 300 percent excess air over that required to provide complete combustion. Natural gas having a heat capacity of 1050 British thermal units per cubic foot is provided at a rate of approximately 3.5 cubic feet per minute per foot of furnace length. Sufficient air was supplied to provide a rate of cold flow of air and fuel of about 150 cubic feet per minute per foot of furnace length.

The temperature of the products of combustion within the plenum, including the excess air, was approximately 1250 degrees Fahrenheit. The volume of flow of the heated products of combustion averaged approximately 500 cubic feet per minute per foot of length of furnace. The rate of air and fuel flow is dependent upon furnace length and is independent of furnace height or vertical dimension of sheets treated from a fraction of an inch to three feet.

The conveyor rollers in the heating section of this example were constructed of stainless steel rod, 53½ inches long, 1¼ inches in diameter, and located on 6-inch centers. The vertical baffle plates 72 and 74, forming the restricted passageways for the conveyed glass, were constructed of silicon carbide, and extended 36 inches in the vertical direction above the plane of support provided by rolls 58.

The space between the two baffle plates was ⅝ inch. Spaced from the outer side of each plate about ½ inch from the surface thereof were radiant heating coils 76 divided into 3 vertical units of 3 horizontal units each on each side of the glass support plane. In this example, the temperature controls for the nine units of radiant heating coils were all set to 1400 degrees Fahrenheit.

As the glass traveled through the furnace, the radiant heaters on each side of the plates 72 and 74 and the upwardly flowing gas from the plenum raised the temperature of the glass to approximately 1200 degrees Fahrenheit by the time it completed its travel through the heating section. The heat must be supplied substantially uniformly to each side to prevent warping of the glass. The radiant heating units are so sdjusted to provide a substantially uniform temperature gradient throughout the height of the glass.

The glass is conveyed through the heating section at a set speed. To obtain proper heat input per unit glass area and hence a proper temperature for tempering in the subsequent quenching section, the rate of flow and temperature of combustion products and the coil temperatures were rigidly controlled.

In the quenching section, air at an ambient temperature of approximately 100 degrees Fahrenheit was supplied to each of the two air chambers 114 and 116 of the tempering section at a pressure of approximately 3 ounces per square inch and was emitted through the slots thereof adjacent the vertical plane of the glass sheet at a rate of 250 cubic feet per minute per square foot of area covered by said chambers.

As the glass traveled through the quenching section, the temperature was lowered through the annealing range in less than two seconds and lowered to approximately 600 degrees Fahrenheit by the time it left the quenching section and at this point was no longer deformable. The glass had a stress, in terms of the center tension thereof as indicated by the birefringent effect of the glass on polarized light waves, of approximately 3200 millimicrons per inch of glass length as measured by standard techniques using a polariscope.

B. *Annealing*

Glass sheets of ¼-inch nominal thickness and approximately 2 feet high and having a stress above 260 millimicrons per inch, which are to be reannealed to lower the residual stress, are placed vertically seriatim upon roller unit A and thereby properly aligned in vertical disposition for travel through heating section B. The glass sheets are transported through the heating section as in the tempering example and under the same operating conditons, with the exception of the temperature level and speed of travel. In the annealing process, the glass is rapidly heated to a temperature of approximately 1025 degrees Fahrenheit, which is at or near the upper limit of the annealing range, and then gradually cooled. For this purpose, the heating section B is extended in length and the plenum 52 is divided into subsections along the length of glass travel, which subsections are independently supplied with products of combustion. Thus, the temperature of the gas which flows upwardly through the restricted path on each side of the vertically supported glass sheet may be varied in temperature along the length of the heating section. In addition, the temperature level of the radiant heating elements 76 may be varied along the length of travel of the heating section. To establish the proper annealing curve, gas is introduced into the first several subchambers of the plenum at a temperature of approximately 1250 degrees Fahrenheit, just as in the tempering process.

When the glass reaches 1050 degrees Fahrenheit, the temperature is maintained for approximately 60 seconds by supplying gas at that temperature through the proper subchambers of the plenum, during which time the internal stresses undergo relaxation. The products of combustion introduced to the succeeding chambers of the plenum over which the glass passes from this point are reduced in temperature by a reduction in the quantity of natural gas supplied to the burners. The supply of air is increased to maintain constant plenum pressures throughout the heating section. The temperature of the gas used to maintain vertical alignment of the glass sheet is thereby progressively decreased stepwise from plenum chamber to plenum chamber, as is the heat supplied by the electric heating coils on each side of the vertical air slots formed by the upright plates 72 and 74. This is continued until the temperature of the glass reaches 600 degrees Fahrenheit, which is below the lower limit of the annealing range.

Below the lower limit of the annealing range, only temporary stress results, and the cooling curve followed to room temperature is not critical. In addition, the glass has already been cooled to below its deformation temperature, and the glass is therefore conveyed directly to the delivery roll system D. The stress, as indicated by the center tension of the glass, can be lowered by this process to aproximately 45 millimicrons per inch with little or no visible distortion from the conveying process.

It should be recognized that once the temperature of the glass reaches the holding temperature of the annealing process, the hot gas and the radiant heat elements no longer produce a net heat flow to the glass but rather selectively retard the cooling of the glass along the predetermined annealing curve. It should be understood that variations in the annealing schedule described may, of course, be used, depending upon the final stress desired and the time for annealing or the length of the heating section that is available.

C. *Coating*

The present invention is especially valuable when applied to the provision of deformable or visco-elastic materials with coatings which must be cured, produced or developed at a temperature at which the base is subject to deformation or warping. Often the durability of an enamel coating on glass can be improved by heating the enamel at a deformation temperature for the glass base. However, since such a temperature would warp the glass, this improvement in durability cannot be achieved in usual processes. By vertically supporting the glass coated with enamel frit on horizontal conveying rolls and maintaining the vertical disposition by an upwardly directed flow of gas on each side of the glass sheet, the frit can be fused at higher temperatures without the deformation previously encountered.

In a typical embodiment, glass sheets are sprayed with the following composition:

| | | |
|---|---|---|
| Bentonite | grams | 1.2 |
| Cryolite | do | 0.8 |
| Boric acid | do | 0.3 |
| Methanol | cubic centimeters | 10 |
| n-Propanol | do | 15 |
| Water | do | 75 |
| Sodium pyrophosphate | grams | 0.1 |
| Aluminum powder (Alcoa No. 322) | do | 10 |

The glass thus coated is fed through the heating section herein disclosed, the temperature of the upwardly flowing gas on each side of the vertically disposed glass sheet being 1250 degrees Fahrenheit and the temperature of the radiant heating elements being the same as described in the tempering example. The glass sheet is held at this temperature until the metal coating has become fused to the base. Thereafter, it is conveyed from the heating section and cooled.

OTHER EMBODIMENTS

While the operating examples disclosed above illustrate specific embodiments of this invention, in many instances it is possible to alter the values or constituents disclosed or substitute equivalents therefor to obtain substantially the same results in substantially the same way.

For example, while a substantially vertical support has been described and is preferred, the disposition of the glass sheet may be inclined somewhat from the vertical while still maintaining acceptable quality in the finished product. The glass sheet should, however, be supported in a generally upright position as distinguished from conventional horizontal conveying.

One embodiment has been disclosed wherein the glass sheets are supported and conveyed upon their lower edges by driven rollers having circumferential grooves to position the sheets. Alternatively, the rollers may be freely rotatable to merely support the sheets, the movement being provided by independent means, such as fingers depending from an endless belt above the glass and in edge contact with the sheets. In a further embodiment, an endless belt of suitable mesh upon which the lower edges of the glass sheets rest may be substituted for the rolls, the mesh allowing a substantially free flow of gas in the upward direction and supporting and conveying the glass sheets.

It will be evident that the direction of gas flow need not be vertical as long as it has a vertical component to supply a force sufficient to prevent contact between the glass sheet and either of plates 72 and 74. In this manner, the glass sheet is maintained in or restored to an equilibrium position in which the major surfaces are kept free from physical contact.

In the heating section, the flow of gas will preferably be generally parallel to the major surfaces of the glass sheet to minimize any deformation that would be caused by the velocity pressure of a directly impinging stream of gas. The gas flow may, however, be directly impinged upon the major surfaces of the glass sheet at an angle, varying from almost parallel to a right angle, as in the tempering section, depending upon the amount of deformation that can be tolerated and the rate of heat transfer required. Because the rate at which heat is transferred between the gas and the glass sheet increases as the angle of impingement approaches 90 degrees, the air in the tempering section is directly impinged upon the surfaces to achieve the desired rate of cooling. Little deformation results from such direct impingement at this cooling stage because the temperature of the glass is rapidly lowered to a point below the deformation temperature by the high rate of heat transfer.

From the standpoint of convenience and economy, it has been found advantageous to utilize the burner arrangement disclosed and the hot products of combustion produced therewith to heat the glass and maintain it in an upright position. Alternatively, heated air or other gas may be supplied by blowers or in other known ways. Furthermore, heat need not be supplied by the supporting flow of gas but may come entirely from radiant sources, in which case the gas may be preheated to merely retard the cooling or may even take heat from the system.

In the above examples the radiant heaters were adjusted to a single temperature setting. In many cases it may be desirable to vary the setting of individual coil sections. For example, to assure even heating of the glass sheets it may be necessary to supply a greater amount of radiant heat to those portions of the major surfaces of the glass sheet that are farthest from the source of gas flow to compensate for heat lost by the gas in traversing the sheet.

It should be evident from the above that, while in the foregoing disclosure certain preferred embodiments of the invention have been disclosed, numerous modifications or alterations may be made therein without departing from the spirit and scope of the invention as set forth in the appended claims.

I claim:

1. Apparatus for heat-treating glass sheets comprising a horizontal roller conveyor comprising a series of substantially parallel rolls spaced longitudinally of said conveyor, each roll being provided with a circumferential groove disposed along a common longitudinal axis of said conveyor for supporting the bottom edge of a plurality of glass sheets disposed along said conveyor, means for rotating said rolls in unison to propel said plurality of glass sheets along said common longitudinal axis, glass sheet heating means disposed along said conveyor comprising an elongated chamber below said conveyor, said elongated chamber having at its uppermost portion a slot opening of a width slightly greater than that of said circumferential grooves, means for introducing hot gas under superatmospheric pressure into said elongated chamber and for causing said gas to flow upwardly through said slot opening, whereby glass sheets conveyed along said path defined by said circumferential grooves are subjected to hot gas flows along the opposite surfaces thereof sufficient to balance the glass sheets in a substantially vertical plane occupied by said circumferential grooves.

2. Apparatus as in claim 1, further including quenching means disposed along said conveyor and located beyond said heating means, said quenching means comprising a chamber on each side of a vertical plane in which said path defined by said circumferential grooves lies, spaced nozzle openings for each chamber providing a series of apertures for each chamber facing said vertical plane, means for providing fluid under pressure to said chambers for exhaust through said series of apertures, and means between said plenum chambers for imparting a vertical component of motion to said fluid.

3. Apparatus as in claim 1, further comprising an elongated, narrow vertical passageway extending longitudinally of said glass sheet heating means and in communication with the slot opening of said elongated chamber, electrical heating means disposed in vertical walls on either side of said substantially vertical plane occupied by said circumferential grooves and arranged to direct radiant heat toward said substantially vertical plane, and control means operatively connected to said electrical heating means to control the thermal output therefrom.

4. In the method of heating a sheet of glass to a deformation temperature while supporting it against deformation, the steps comprising supporting the sheet of glass in a substantially vertical position upon only a lower edge portion thereof, heating a gas to a temperature higher than that of the glass, flowing said gas so that the gas contacts the sheet first at one edge and then flows cross the major surfaces of the sheet to an opposite edge, the direction of said flow being controlled to produce at least a component of flow in a vertical direction, radiating heat to the major surfaces of the glass sheet and controlling the radiated heat so as to radiate a greater quantity of heat to portions of the major surfaces of the glass sheet adjacent the said opposite edge than to portions adjacent said one edge.

5. A method of tempering glass sheets comprising disposing a sheet of glass in an upright position, supporting said upright sheet by a lower edge thereof, moving said sheet in an edgewise horizontal direction along a predetermined path of travel through an elongated restricted passageway, applying from a source beneath said sheet an upwardly directed flow of heated fluid on opposite sides of said sheet and within said restricted passageway to balance the sheet in a substantially vertical plane and to convectively heat the sheet, radiating heat to the supported sheet and controlling the radiation of heat to supply a greater amount of radiant heat to portions of the sheet that are farthest from the source of gas flow, whereby the sheet is substantially uniformly heated to a deformation temperature suitable for tempering; and thereafter balancing said sheet in a vertical position by directing a flow of cooling gas against each side of the sheet while the sheet is supported by a lower edge thereof.

6. A method of tempering a sheet of glass heated to a suitable tempering temperature which comprises supporting the sheet in a substantially vertical position upon its bottom edge only, conveying said sheet is a horizontal path in an edgewise direction by frictional contact with the bottom edge only of the sheet, and quenching said sheet by directing a flow of cooling fluid in a substantially horizontal direction against the major surfaces of the sheet while balancing the sheet in a vertical position by deflecting a portion of said horizontally directed fluid in an upward direction adjacent each major surface of the sheet.

7. The method of claim 5 wherein substantially equal flows of cooling gas at substantially equal pressures are directed against each side of the sheet and wherein the sheet is tempered by said flows.

8. In a method of tempering glass sheets, the steps comprising supporting a vertically disposed sheet at spaced locations along a lower edge of the sheet, moving the supported sheet in an edgewise direction along a predetermined path, establishing a source of gas under pressure greater than atmospheric and at a temperature above that of the glass sheet beneath the supported sheet along one portion of the path, balancing the vertically disposed sheet by flowing gas upwardly from said source along each major surface of the sheet from the supported edge to an opposite edge of the sheet, confining the flow of gas closely adjacent portions of the major surfaces of the sheet while permitting the gas to escape in the direction of upward flow, radiating heat to the major surfaces of the glass sheet, radiating a greater quantity of heat to portions of the major surfaces of the glass sheet adjacent the said opposite edge than to portions adjacent the said supported edge, establishing a source of gas at a temperature cooler than the temperature of the glass and under pressure greater than atmospheric pressure, and quenching the sheet along a subsequent portion of the path by directing flows of the cooler gas in a substantially horizontal direction against the major surfaces of the sheet while balancing the sheet in a vertical position by deflecting a portion of the horizontally directed flow of gas in an upward direction adjacent each major surface of the sheet.

9. In a method of treating glass sheet, the steps comprising heating to a deformation temperature and balancing in a vertical position a sheet of glass that is supported along a lower edge thereof by directing a flow of gas at a temperature above that of the glass upwardly along the opposite major surfaces of the sheet, conveying the sheet while so heating and balancing the sheet to a tempering zone and then rapidly cooling and balancing the sheet in the vertical position by directing a flow of gas at a temperature below that of the glass toward the major surfaces of the sheet.

References Cited by the Examiner

UNITED STATES PATENTS

| | | | |
|---|---|---|---|
| 1,576,516 | 3/1926 | Koupal | 65—118 |
| 1,879,698 | 9/1932 | Long | 65—114 |
| 2,194,611 | 3/1940 | Paddock et al. | 65—114 X |
| 2,199,511 | 5/1940 | Perry et al. | 65—114 |
| 3,062,520 | 11/1962 | Frey et al. | 65—182 X |

FOREIGN PATENTS

| | | |
|---|---|---|
| 1,149,169 | 7/1957 | France. |
| 410,547 | 5/1934 | Great Britain. |

DONALL H. SYLVESTER, *Primary Examiner.*